Patented Aug. 15, 1950

2,518,608

UNITED STATES PATENT OFFICE 2,518,608

ATMOSPHERIC PRESSURE CYANATION OF DIHALOBUTENES IN THE LIQUID PHASE

Mark Wendell Farlow, Wilmington, Del., assignor to E. I. du Pont de Nemours & Company, Wilmington, Del., a corporation of Delaware No Drawing. Application August 14, 1947,
Serial No. 768,705

6 Claims. (Cl. 260—465.8)

This invention relates to an improved process for preparing organic nitriles and more particularly to 1,4-dicyano-2-butene.

Following the discovery of 1,4-dicyano-2-butene (see U. S. Patent 2,342,101), improved methods of preparing this industrially important chemical were proposed (Applications Ser. No. 768,283, filed August 12, 1947 by G. M. Whitman, now patent No. 2,477,674 and Ser. No. 768,284 filed August 12, 1947 by J. R. Johnson and G. M. Whitman, now patent No. 2,477,617) wherein the principle was laid down that, in order to achieve commercially practical yields the cyanation of the starting materials, i. e., 1,4-dichloro-2-butene or 3,4-dichloro-1-butene, must be carried out under non-alkaline conditions. It was highly desirable from a practical standpoint to devise a method whereby non-alkaline cyanation could be accomplished in aqueous media with a high reaction rate, at moderate temperatures and without the use of pressure equipment.

It is an object of this invention to provide an improved process for preparing 1,4-dicyano-2-butene. Another object is to provide a process for preparing 1,4-dicyano-2-butene in an aqueous system with a high reaction rate and at a pressure not substantially exceeding atmospheric pressure. Other objects will appear hereinafter.

These objects are accomplished by the process which comprises introducing hydrogen cyanide gradually into a reaction mixture comprising water, a dihalo addition product of 1,3-butadiene wherein the halogen atoms are of atomic weight between 35 and 80, a copper salt catalyst and a carbonate of a metal of Group II of the Periodic Table in amount sufficient to neutralize the hydrogen halide formed, the reaction being carried out at a pressure not substantially above atmospheric pressure and at a temperature between 60° C. and the boiling point at atmospheric pressure of the aqueous phase. The hydrogen cyanide is preferably introduced into the reaction mixture at a controlled rate sufficient to produce refluxing of the hydrogen cyanide.

It is known that addition of halogens, e. g. chlorine or bromine, to 1,3-butadiene gives a mixture of two isomeric dihalogen addition products, namely, 1,4-dihalo-2-butene and 3,4-dihalo-1-butene (see, for example, Muskat and Northrup in J. Am. Chem. Soc. 52, 4043, (1930)). In the process described herein, either isomer, or their mixtures in any proportions, can be used to yield 1,4-dicyano-2-butene. Either the dichloro or the dibromobutenes can be used. The dichlorobutenes are cheaper and therefore preferred. In the description which follows, the term "dihalobutene" is sometimes used in the interest of brevity. It should be understood that the term refers to either the 1,4-dihalo-2-butenes or the 3,4-dihalo-1-butenes wherein the halogen is chlorine or bromine.

In the preferred practice of this invention there is used, in the overall reaction period, at least two moles of hydrogen cyanide per mole of dihalobutene, since otherwise the yield of dicyanobutene would be correspondingly reduced. Preferably, there is used an excess, of the order of 5 to 50% of the theoretical, of hydrogen cyanide. Of course, near the end of the reaction or after all the dihalobutene has reacted, there is no harm in adding a larger excess. Commercial hydrogen cyanide boiling at 26° C. may be used as such, or diluted with water. The hydrogen cyanide is preferably added at a controlled rate sufficient to maintain refluxing of the hydrogen cyanide but not substantially exceeding its rate of reaction with the dihalobutene, for reasons discussed later.

The carbonate of any metal of Group II of the Periodic Table may be used, e. g., the carbonates of beryllium, magnesium, calcium, zinc, strontium or barium. For reasons of availability and effectiveness, the preferred carbonates are those of metals having atomic weights below 138. The most useful are the carbonates of calcium, magnesium, and barium, particularly the first named. Preferably there is used at least one mole of carbonate per mole of dihalobutene. Much more can be used if desired, for example 3 moles or more, but a large excess of carbonate does not increase the yields and is uneconomical. The metal carbonate, which is substantially insoluble in water, acts as an automatic pH regulator by reason of the fact that it reacts with the hydrogen halide formed during the reaction converting it into the corresponding Group II metal halide, which is mildly acidic in aqueous solution. Consequently, the overall effect of the metal carbonate is to keep the reaction non-alkaline.

Salts of copper are specific catalysts for this reaction. The salt of copper may be introduced in the reaction medium preformed, for example, as cuprous chloride-alkali metal halide complex or cuprous chloride-ammonium chloride complex or it may be formed in situ, for example, by adding cuprous chloride or cuprous cyanide which is solubilized in the presence of the Group II metal halide formed in situ, or by adding metallic copper to the reaction mixture in which case at least a part of the copper dissolves and is converted to a catalytic form. Cupric salts may be used as they are reduced during the reaction to cuprous salts. The copper catalyst is suitably used in amounts between 0.1% and 10% based on the dihalobutene, a preferred proportion being between 0.5% and 3%. The reaction will proceed without catalyst but the rate is then much slower and the process becomes of less practical value.

The amount of water to be used is not critical. The optimum amount is determined rather by certain practical considerations, of which the dominant one is that the initial reaction mixture should be fluid enough to allow good and rapid contact between the reactants or, more specifically, to permit stirring as an aqueous suspension. There should be enough water in relation to the hydrogen cyanide present at any given moment to avoid excessive cooling by evaporation of the low boiling hydrogen cyanide and to hold it in solution, since the operation is not conducted under pressure. Moreover, it is desirable although not essential that the Group II metal halide formed during the reaction be all in solution at the end to facilitate its disposal. In general, the above practical requirements are adequately fulfilled when the amount of water used is at least equal to the weight of the Group II metal carbonate employed, although this may vary somewhat depending on the solubility properties of the Group II metal halide formed in the reaction. Much more water may be used, up to 20 or 30 times that amount, without affecting the reaction, although it is desirable to keep the amount of aqueous medium down to a minimum in order to reduce the size of the equipment. Some water (one mole per mole of dihalobutene) is of course formed during the cyanation through the reaction of the Group II metal carbonate with the halogen halide. Water alone is preferred as the reaction medium, but it may contain organic solvents such as short chain alcohols or nitriles.

The initial aqueous reaction mixture may be neutral or moderately acidic, i. e., it may have a pH ranging from 7 to about 1. As soon as the reaction starts, the Group II metal carbonate through its reaction with the hydrogen halide automatically maintains the pH between about 4 and about 6.

The reaction rate becomes very slow at temperatures below about 60° C. On the other hand, since one of the objects of the invention is to avoid the use of pressure equipment, the maximum operable temperature is the boiling point (at atmospheric pressure) of the aqueous reaction mixture. Generally this will not exceed about 105° C. The optimum temperature range is between 80 and 100° C. If desired, the reaction can be carried out under reduced pressure, provided the minimum temperature mentioned above is maintained, but there is no advantage in so doing. In the preferred practice the operation is performed at atmospheric pressure, with suitable arrangement for efficient reflux of the volatile components. Since hydrogen cyanide boils at 26° C., an ice-water cooled condenser is used to advantage. It is understood of course that local zones of pressure somewhat higher than atmospheric may occasionally develop.

Under the preferred conditions discussed above and shown in the examples below the reaction proceeds at a very satisfactory rate. The reaction achieves its maximum rate, of course, only when hydrogen cyanide is introduced at least as rapidly as it can be consumed. Introduction of hydrogen cyanide at rates below the optimum apparently produces no adverse results other than to lower the reaction rate, provided the reaction mixture is kept above the minimum temperature (about 60° C.) necessary for a practical reaction rate. On the other hand when hydrogen cyanide is introduced much more rapidly than it can be absorbed, a considerable amount may be carried from the reaction mixture along with the evolved carbon dioxide; or when such large excess of hydrogen cyanide is condensed and returned to the reaction mixture overloading and flooding of the condenser may occur or the cooling effect of the heavy reflux may lower the reaction temperature and thus decrease the reaction rate below the practical limits. Thus it will be seen that the optimum procedure involves operating above 60° C. and with the addition of hydrogen cyanide rapid enough to maintain a moderate reflux of hydrogen cyanide. An additional means of following the rate and extent of reaction can be provided by leading the evolved carbon dioxide through a gas meter. Conversion of one molecule of dihalobutene to 1,4-dicyano-2-butene requires absorption of two molecules of hydrogen cyanide and liberation of one molecule of carbon dioxide. Under optimum conditions there is a continuous and moderately rapid outflow of carbon dioxide.

The invention is illustrated in greater detail by the following examples, in which parts are by weight.

Example I

A mixture of the following materials is prepared under an atmosphere of nitrogen in a reaction vessel equipped with a mechanical stirrer, dropping funnel, and condenser, cooled with circulating ice water: cuprous chloride 5.0 parts, potassium chloride 2.32 parts, copper powder 1.0 part, concentrated hydrochloric acid 1.2 parts, and water 200 parts. The mixture is heated at a temperature of 80–90° C. for 10 minutes after which 40 parts of calcium carbonate is added. To the resulting suspension at 80–90° C. is added gradually with stirring over a period of 20 minutes a solution made by mixing 50 parts of 1,4-dichloro-2-butene and 30 parts of liquid hydrogen cyanide. During the addition carbon dioxide gas is evolved rapidly until addition of the reagents is complete after which the product consists of an almost clear lower aqueous solution of calcium chloride and an upper oily layer of 1,4-dicyano-2-butene. The latter solidifies when the mixture is cooled.

The 1,4-dicyano-2-butene is extracted with chloroform and the product, after removal of the chloroform, is distilled at a pressure of about 1 mm. of mercury. There is obtained 2.29 parts of a low boiling foreshot, 33.09 parts of 1,4-dicyano-2-butene boiling in the range 90–110° C. and melting at 73° C., and a distillation residue of 0.51 part. The yield of 1,4-dicyano-2-butene is 78% of the theoretical.

It has been observed that with a reaction medium containing calcium carbonate of the type described in this and other examples the pH of the reaction mixture varies over a range of approximately 4–6. If the experiment is repeated under substantially identical conditions except that the calcium carbonate is omitted, the reaction during two and one-half hours at 60–70° C. gives only 16.3% of the theoretical yield of 1,4-dicyano-2-butene together with a substantial proportion of unreacted dichlorobutene. In this case the pH of the reaction mixture reaches very low values, of the order of 0.1, soon after the addition of the hydrogen cyanide-dichlorobutene mixture is started.

Example II

A catalyst prepared from 1.0 part cuprous chloride, 0.2 part copper powder, 0.46 part potassium chloride and 0.25 part concentrated hydrochloric acid is placed in 400 parts of water, followed by addition of 80 parts of calcium carbonate. There is then added to the suspension at 80–90° C., in the apparatus described in Example I, a solution prepared by mixing 100 parts of 1,4-dichloro-2-butene with 60 parts of liquid hydrogen cyanide. Completion of the reaction requires 75 minutes. The product worked up as in Example I gives 2.60 parts foreshot, 76.01 parts of 1,4-dicyano-2-butene, M. P. 73° C., and a distillation residue of 0.11 part. The yield is 90% of the theoretical.

Example III

A reaction vessel equipped with an efficient mechanical agitator, inlet for nitrogen, reflux condenser cooled with circulating Dry Ice-acetone, thermocouple well, and a liquid inlet is charged with 15 parts of cuprous chloride, 3 parts of copper powder, 3.6 parts of concentrated hydrochloric acid, 6.9 parts of potassium chloride and 2000 parts of distilled water. The mixture is heated with stirring under an atmosphere of nitrogen to a temperature of approximately 80° C. Five hundred and twenty-five (525) parts of finely powdered calcium carbonate and an additional 1000 parts of distilled water is then added and the reddish-orange suspension is heated to a temperature of 95° C. with vigorous stirring. A mixture of 625 parts of 3,4-dichloro-1-butene with 308 parts of liquid hydrogen cyanide is added gradually through the liquid inlet over a period of 2 hours and 15 minutes while maintaining the temperature of the reaction mixture at 95° C.±1° C. During the course of the reaction carbon dioxide is evolved and hydrogen cyanide refluxes in the condenser until all of the hydrogen cyanide-dichlorobutene mixture has been added. Simultaneously, the calcium carbonate goes into solution, except for the slight excess used, so that at the end of the reaction there is obtained an aqueous calcium chloride solution with an upper layer of the reaction product. The mixture is then cooled to 60° C., a small proportion of chloroform added to prevent crystallization of the product and the temperature is finally brought to 25° C. by rapid cooling. The cold mixture is extracted with 4000 parts by volume of chloroform and the organic layer is separated from the aqueous layer, the chloroform solution is filtered, dried over anhydrous calcium sulfate, and the solvent removed in a continuous stripping still operated under slightly reduced pressure. The solid residue is then fractionated in a precision still to give 509.5 parts of pure 1,4-dicyano-2-butene, M. P. 75–76° C. There is obtained only 14 parts of a liquid foreshot in the distillation. The yield of refined 1,4-dicyano-2-butene corresponds to 95.9% of the theoretical value based on the dichlorobutene.

Example IV

A reaction vessel fitted with an efficient agitator, inlet for nitrogen, a liquid charging device, thermometer, reflux condenser, and a glass electrode system for measuring the pH of aqueous solutions is charged with 50.0 parts of powdered calcium carbonate and 175 parts of distilled water. The calcium carbonate used in this example had been recovered from a previous run by treatment of the aqueous phase with sodium carbonate, filtration of the precipitated calcium carbonate, washing and drying. After heating the mixture to about 90° C. there is added 2.3 parts of hydrated copper sulfate ($CuSO_4.5H_2O$) in 15 parts of distilled water. The mixture is then maintained at 90–97° C. and a solution of 62.5 parts of 3,4-dichloro-1-butene in 30.0 parts of liquid hydrogen cyanide is added over a period of one hour and 5 minutes. During this period the pH value as measured by a glass electrode system ranges from 4.7 to 5.7. The reaction mixture is cooled to 15° C. with stirring to bring about crystallization of the organic layer which is then separated by filtration and washed with 100 parts of cold distilled water. There is obtained 46.7 parts of crude crystalline 1,4-dicyano-2-butene. Chloroform extraction of the aqueous filtrate gives an additional 4.8 parts of product. On combining the products and recrystallizing from thiophene-free benzene there is obtained 43.7 parts of pure 1,4-dicyano-2-butene, M. P. 76° C. The yield is 85% of the theory.

When this experiment is repeated using copper nitrate, copper acetate, cuprous chloride, cupric chloride or cupric fluoride in place of copper sulfate substantially identical results are obtained. Instead of using a preformed soluble copper salt, it can be produced in situ by the addition of metallic copper in the system, the metal being solubilized as the reaction proceeds. A copper complex such as copper acetylacetonate may be used as a source of copper.

Example V

A mixture of 3 parts of cuprous cyanide, 50 parts of calcium carbonate and 175 parts of water is charged into a reaction vessel equipped as described in Example III. The mixture is heated to 99.5–101° C. and treated gradually at that temperature with a solution of 30.8 parts of hydrogen cyanide in 62.5 parts of 1,4-dichloro-2-butene, added in the course of 38 minutes. After stirring at 101–105° C. for an additional 4 minutes the contents of the vessel are cooled to 15° C. and the solid 1,4-dicyano-2-butene is filtered off, washed with 100 parts of water and dried. The yield of dry material is 49 parts or 92.5% of the theory.

Example VI

A reaction vessel equipped with an efficient mechanical agitator, reflux condenser cooled with circulating Dry Ice-acetone, thermometer and a liquid inlet is charged with 2.32 parts of copper sulfate pentahydrate ($CuSO_4.5H_2O$), 50.5 parts of calcium carbonate and 175 parts of distilled water. The mixture is heated with stirring to 100° C. and then 68.6 parts of crude dichlorobutene (containing 62.5 parts of 1,4-dichloro-2-butene) is added. During 20 minutes 30.8 parts of liquid hydrogen cyanide is added at such a rate that the reaction temperature is maintained at 90–95° C. After an additional ten minutes of heating and stirring, reaction is complete as evidenced by the cessation of carbon dioxide evolution. The reaction mixture is cooled to 10° C. with stirring to bring about crystallization of the organic layer, which is then separated by filtration and washed with 100 parts of cold distilled water, followed by 71 parts of cold diethyl ether. Upon drying the crystallized material there is obtained 39.0 parts of 1,4-dicyano-2- butene, or 73.6% of the theory. An additional 4.9 parts of 1,4-dicyano-2-butene is obtained from the aqueous filtrate and ether wash by extraction with chloroform and distillation of the extract. The total yield of dicyanobutene is 43.0 parts or 82.9% of the theory.

Although in the foregoing examples certain conditions of temperature, catalyst concentration, and proportions of reactants are described, it is to be understood that these values can be varied within the scope of the invention.

Moreover, certain variations in procedure will suggest themselves to the skilled chemist. For example, the hydrogen cyanide may be dissolved in water beforehand for easier handling or it may be bubbled as gas through the fluid reaction mixture and if desired through several inlets to facilitate contact. While the examples illustrate a convenient method of introducing the dihalobutene and the hydrogen cyanide, wherein the two reactants are mixed beforehand, this is by no means necessary. They can be added separately, and at different rates. In fact, the operation can be conducted with part or all of the dihalobutene present in the mixture of water, Group II metal carbonate and catalyst before any hydrogen cyanide is added. However, the reverse procedure, (i. e., addition of the dihalobutene to a reaction mixture containing considerable hydrogen cyanide) is undesirable because of the disadvantages, already discussed, caused by the presence in the reaction mixture of hydrogen cyanide in substantial quantities. Furthermore, large amounts of hydrogen cyanide could not be kept in the mixture without using pressure equipment. For this reason the hydrogen cyanide is added at a controlled rate not substantially faster than its rate of reaction with the dihalobutenes. The optimum rate of addition of the hydrogen cyanide is readily determined by observation of the rate of reflux in the refluxing system and of the temperature of the reaction medium. While it is preferable to add the hydrogen cyanide continuously, the controlled rate of addition can also be achieved by adding the hydrogen cyanide periodically or intermittently in small amounts during the course of the reaction.

Instead of charging all of the Group II metal carbonate at once in the reaction vessel, it can be added gradually as the reaction proceeds, provided of course that there is always enough of it present to absorb the hydrogen halide. This method has the advantage of permitting better contact between the reactants by decreasing the quantity of solid material present at a given moment.

While the examples illustrate the use of an inert atmosphere during the reaction, this is merely an optional procedure, since the reaction proceeds very satisfactorily when this precaution is omitted. In any event, the formation of carbon dioxide prevents any excessive contact with air which might cause oxidation.

Instead of using either a 1,4-dihalo-2-butene or a 3,4-dihalo-1-butene, it is possible and even desirable economically to use their mixtures, for example as they are obtained by addition of halogen to 1,3-butadiene. In particular, it is possible to employ the crude mixture resulting from the chlorination of butadiene, which contains some tetrachlorobutane in addition to the two dichlorobutenes, with no substantial sacrifice in the yield of 1,4-dicyano-2-butene.

The resulting 1,4-dicyano-2-butene may be isolated by any suitable method such as cooling and recrystallization of the solid dinitrile, or extraction by means of an appropriate solvent. The reaction product may be purified if desired, but for many purposes the crude reaction product is entirely satisfactory.

1,4-dicyano-2-butene is of value as an intermediate and starting material for intermediates in many syntheses, for example, through conversion to dihydromuconic acid by hydrolysis or to hexamethylenediamine by reduction, the latter being one of the principal ingredients of certain polyamides generically designated as nylon. It is also the starting material for preparing the isomeric 1,4-dicyano-1-butene which is itself an intermediate of considerable interest in chemical syntheses.

As many apparently widely different embodiments of this invention may be made without departing from the spirit and scope thereof, it is to be understood that the invention is not limited to the specific embodiments thereof except as defined in the appended claims.

I claim:

1. Process for preparing 1,4-dicyano-2-butene by reaction at atmospheric pressure of hydrogen cyanide with a dihalo addition product of 1,3-butadiene wherein the halogen atoms are of atomic weight between 35 and 80, which comprises heating in the liquid phase to a temperature of 80° to 105° C. under atmospheric pressure a mixture comprising a copper salt catalyst, a carbonate of a metal of Group II of the Periodic Table in amount sufficient to neutralize the hydrogen halide formed by the reaction and to maintain the reaction mixture at a pH between 4 and 6 throughout the reaction, and water in amount by weight at least equal to said carbonate, adding to said aqueous mixture the dihalo addition product of 1,3-butadiene and the hydrogen cyanide as the sole cyanating agent, the latter being introduced during the reaction at a controlled rate sufficient to maintain moderate reflux of hydrogen cyanide but not substantially exceeding its rate of reaction with the dihalo addition product of 1,3-butadiene, and maintaining the temperature of the reaction mixture throughout the reaction between 80° and 105° C.

2. Process for preparing 1,4-dicyano-2-butene by reaction at atmospheric pressure of hydrogen cyanide with 1,4-dichloro-2-butene which comprises heating in the liquid phase to a temperature of 80° to 105° C. under atmospheric pressure, a mixture comprising 1,4-dichloro-2-butene, a copper salt catalyst, calcium carbonate in amount sufficient to neutralize the hydrogen chloride formed by the reaction and to maintain the reaction mixture at a pH between 4 and 6 throughout the reaction, and water in amount by weight at least equal to said calcium carbonate, adding during the reaction to said aqueous mixture the hydrogen cyanide, as the sole cyanating agent, at a controlled rate sufficient to maintain moderate reflux of hydrogen cyanide but not substantially exceeding its rate of reaction with the 1,4-dichloro-2-butene, and maintaining the temperature of the reaction mixture throughout the reaction between 80° and 105° C.

3. A process as set forth in claim 1 wherein said carbonate is calcium carbonate.

4. A process as set forth in claim 1 wherein said dihalo addition product of 1,3-butadiene is a dichloro addition product of 1,3-butadiene.

5. A process as set forth in claim 1 wherein said dihalo addition product of 1,3-butadiene is 1,4-dichloro-2-butene.

6. A process as set forth in claim 1 wherein said copper salt catalyst is a hydrochloric acid-cuprous chloride catalyst.

MARK WENDELL FARLOW.

REFERENCES CITED

The following references are of record in the file of this patent:

UNITED STATES PATENTS

| Number | Name | Date |
|---|---|---|
| 1,672,253 | Giles | June 5, 1928 |
| 1,692,417 | Pongratz | Nov. 20, 1928 |
| 2,097,155 | Groll et al. | Oct. 26, 1937 |
| 2,242,084 | Nicodemus et al. | May 13, 1941 |
| 2,342,101 | Cass et al. | Feb. 22, 1944 |
| 2,415,261 | Rogers | Feb. 4, 1947 |
| 2,448,755 | Zellner | Sept. 7, 1948 |
| 2,477,597 | Hager | Aug. 2, 1949 |
| 2,477,617 | Johnson et al. | Aug. 2, 1949 |
| 2,477,672 | Webb et al. | Aug. 2, 1949 |
| 2,477,674 | Whitman | Aug. 2, 1949 |

FOREIGN PATENTS

| Number | Country | Date |
|---|---|---|
| 708,111 | France | July 20, 1931 |

OTHER REFERENCES

Breckpot, Bull. Soc. Chim. Belg., vol. 39, pages 462–469 (1930).